(12) United States Patent
Kowalski et al.

(10) Patent No.: US 10,494,042 B2
(45) Date of Patent: Dec. 3, 2019

(54) METHOD FOR MANUFACTURING A CENTRAL UNDERBODY PORTION INCLUDING A MULTI-PART TUNNEL

(71) Applicant: RENAULT s.a.s., Boulogne Billancourt (FR)

(72) Inventors: Philippe Kowalski, Montigny le Bretonneux (FR); Thierry Hlubina, Chaville (FR)

(73) Assignee: Renault s.a.s., Boulogne Billancourt (FR)

( * ) Notice: Subject to any disclaimer, the term of this patent is extended or adjusted under 35 U.S.C. 154(b) by 448 days.

(21) Appl. No.: 15/111,661

(22) PCT Filed: Nov. 17, 2014

(86) PCT No.: PCT/FR2014/052934
§ 371 (c)(1),
(2) Date: Jul. 14, 2016

(87) PCT Pub. No.: WO2015/107272
PCT Pub. Date: Jul. 23, 2015

(65) Prior Publication Data
US 2016/0332686 A1   Nov. 17, 2016

(30) Foreign Application Priority Data

Jan. 14, 2014 (FR) .................................. 14 50278

(51) Int. Cl.
*B62D 65/02* (2006.01)
*B62D 25/20* (2006.01)
*B62D 21/15* (2006.01)

(52) U.S. Cl.
CPC .......... *B62D 65/02* (2013.01); *B62D 21/152* (2013.01); *B62D 25/2018* (2013.01);
(Continued)

(58) Field of Classification Search
CPC ........ B62D 25/20; B62D 65/00; B62D 65/02; B62D 25/2036; B62D 21/152;
(Continued)

(56) References Cited

U.S. PATENT DOCUMENTS 3,279,816 A * 10/1966 Issigonis ................ B62D 21/04
280/792
5,567,005 A    10/1996 Kosuge et al.
(Continued)

FOREIGN PATENT DOCUMENTS

DE     195 07 767 A1    9/1995
EP     2 441 653 A1     4/2012
(Continued)

OTHER PUBLICATIONS

International Search Report dated Jul. 28, 2015 in PCT/FR14/52934 Filed Nov. 17, 2014.
(Continued)

*Primary Examiner* — Sarang Afzali
*Assistant Examiner* — Darrell C Ford
(74) *Attorney, Agent, or Firm* — Oblon, McClelland, Maier & Neustadt, L.L.P.

(57) ABSTRACT

A method for manufacturing a central underbody portion of a structural body of a motor vehicle to delimit a bottom of a passenger compartment of the vehicle. The method includes assembling a floor of the central underbody portion, attaching an integral central profile to the floor, arranged in a longitudinal direction of the vehicle and having a length dependent on a length of the central underbody portion in the longitudinal direction, and assembling at least one end piece forming an extension of the central profile. The end piece has an interface providing a connection and a function of absorbing and transmitting forces with a structural portion of the body that is separate from the central underbody portion (Continued)

and/or with the floor. The attaching includes adapting the length of the central profile as a function of the length of the central underbody portion in the longitudinal direction.

15 Claims, 3 Drawing Sheets

(52) U.S. Cl.
CPC ..... *B62D 25/2027* (2013.01); *B62D 25/2036* (2013.01); *B62D 25/2045* (2013.01); *Y10T 29/49616* (2015.01); *Y10T 29/49622* (2015.01); *Y10T 29/49623* (2015.01); *Y10T 29/49625* (2015.01); *Y10T 29/49627* (2015.01); *Y10T 29/49789* (2015.01); *Y10T 29/49798* (2015.01)

(58) Field of Classification Search
CPC ............ B62D 25/2018; B62D 25/2027; B62D 25/2045; Y10T 29/49789; Y10T 29/49798; Y10T 29/49616; Y10T 29/49622; Y10T 29/49623; Y10T 29/49625; Y10T 29/49627
USPC ........ 29/897, 897.2, 897.3, 897.31, 897.312, 29/412, 417; 296/187.02, 193.07
See application file for complete search history.

(56) References Cited

U.S. PATENT DOCUMENTS

| | | | |
|---|---|---|---|
| 5,806,918 A * | 9/1998 | Kanazawa | B62D 21/07 296/204 |
| 10,106,203 B2 * | 10/2018 | Nakanishi | B62D 25/2036 |
| 10,137,934 B2 * | 11/2018 | Nakamoto | B62D 21/152 |
| 10,167,023 B2 * | 1/2019 | Schneider | B62D 25/20 |
| 2002/0067053 A1 | 6/2002 | Wolkersdorfer et al. | |
| 2004/0239091 A1 * | 12/2004 | Horton | B62D 21/02 280/781 |
| 2005/0189791 A1 * | 9/2005 | Chernoff | B62D 25/20 296/193.07 |
| 2009/0188100 A1 | 7/2009 | Durney et al. | |
| 2010/0066125 A1 * | 3/2010 | Egawa | B62D 25/2036 296/193.07 |
| 2010/0084892 A1 * | 4/2010 | Yoshida | B21D 7/08 296/203.02 |
| 2012/0153679 A1 * | 6/2012 | Yasuhara | B62D 21/152 296/203.02 |
| 2012/0313399 A1 * | 12/2012 | Caliskan | B62D 25/20 296/193.01 |
| 2019/0009833 A1 * | 1/2019 | Yamagishi | B62D 27/02 |
| 2019/0202286 A1 * | 7/2019 | Natsume | B60K 17/00 |

FOREIGN PATENT DOCUMENTS

| | | |
|---|---|---|
| WO | 2009/086329 A1 | 7/2009 |
| WO | 2010/130905 A1 | 11/2010 |

OTHER PUBLICATIONS

French Search Report dated Oct. 21, 2014 in French Application No. 1450278 Filed Jan. 14, 2014.

* cited by examiner

METHOD FOR MANUFACTURING A CENTRAL UNDERBODY PORTION INCLUDING A MULTI-PART TUNNEL

TECHNICAL FIELD OF THE INVENTION

The invention concerns a central underbody portion of the structural body of a motor vehicle, intended to delimit the bottom of a passenger compartment of the vehicle and to be interposed between the front and rear structural portions.

The object of the invention is also a method for manufacturing such a central underbody portion.

PRIOR ART

Conventionally, the central underbody portion comprises a longitudinal structural tunnel arranged in the longitudinal direction of the vehicle so that it extends over the entire length of the central portion and is centered over the width of the central portion in the lateral direction of the vehicle.

A known technique consists of producing the longitudinal tunnel integrally of one piece, with a front interface for the transmission and the absorption of forces relative to the front structural portion of the body, and a rear interface for the transmission and absorption of forces relative to the rear structural portion of the body. These interfaces may also be produced relative to the floor of the central portion equipped with this longitudinal tunnel.

To meet the requirements of mechanical strength, the part is dimensioned accordingly and formed of a suitable material, rendering it heavy. The force transmission capacity also remains limited despite the potentially large dimensions.

Also, it is known that a family of vehicles may have vehicles with a first length and vehicles with a second length greater than the first length, in particular as a function of the desired seating capacity. These differences are reflected in different lengths of the central underbody portion of the two vehicles. As a result it is necessary to design, produce, store, implement and install the constituent parts of longitudinal tunnels with different lengths. All these operations are onerous and the flexibility offered by existing solutions is not satisfactory.

OBJECT OF THE INVENTION

The object of the present invention is to propose a central underbody portion of the structural body of a motor vehicle which remedies the drawbacks listed above.

In particular, an object of the invention is to provide such a central underbody portion and a structural body which allow:
- a gain in mass relative to existing solutions,
- an increase in the level of forces which can be transmitted via the longitudinal structural tunnel in the case of impact, in comparison with existing solutions,
- an improvement in the adaptability to different lengths within the same vehicle family, increasing flexibility and improving costs,
- retention of feasibility within a small allotted volume, in particular with a constant cross-section and variable lengths.

This object may be achieved by a method for manufacturing a central underbody portion of a structural body of a motor vehicle, intended to delimit the bottom of a passenger compartment of the vehicle, including a longitudinal structural tunnel, comprising the assembly of:
- a floor of the central underbody portion,
- an integral central profile attached to the floor, arranged in a longitudinal direction of the vehicle and having a length that is dependent on the length of the central underbody portion in the longitudinal direction,
- and at least one end piece forming an extension of the central profile and configured so as to have an interface providing a connection and a function of absorbing and transmitting forces with a structural portion of the body that is separate from the central underbody portion and/or with the floor, characterized in that it includes a step of adapting the length of the central profile as a function of the length of the central underbody portion in the longitudinal direction of the vehicle.

According to further additional characteristics of the invention, the adaptation step comprises a step of providing an initial profile then a step of cutting the initial profile to define the length of the central profile, in particular by selecting from at least a length according to the first value corresponding to the first type of central underbody portion and a length according to the second value corresponding to the second type of the central underbody portion.

According to further additional characteristics of the invention, the central profile has a length with a first value dimensioned such that the central underbody portion has a length enabling it to receive, on the passenger compartment side, two seats spaced apart in a lateral direction of the vehicle, the central underbody portion fitted with the central profile having the length corresponding to said first value constituting a first type of central underbody portion.

According to further additional characteristics of the invention, the central profile has a length with a second value dimensioned such that the central underbody portion has a length enabling it to receive, on the passenger compartment side, four seats distributed in two rows spaced apart in the longitudinal direction and each containing two seats spaced apart in the lateral direction, the central underbody portion fitted with the central profile having the length corresponding to said second value constituting a second type of central underbody portion.

According to further additional characteristics of the invention, said at least one end piece is configured so that it can be used independently within a central underbody portion of the first type and within a central underbody portion of the second type.

According to further additional characteristics of the invention, the central profile belonging to the first type of central underbody portion and the central profile belonging to the second type of central underbody portion are adapted, in particular by cutting, from an identical initial profile.

According to further additional characteristics of the invention, said at least one end piece comprises:
- a front end piece mounted at the front end of the central profile, in the extension of the central profile in the longitudinal direction, and having an interface providing a connection and a function of absorbing and transmitting forces with a front structural portion of the body that is separate from the central underbody portion and/or with the floor,
- and a rear end piece mounted at the rear end of the central profile, in the extension of the central profile, in the longitudinal direction and having an interface providing a connection and a function of absorbing and transmitting forces with a rear structural portion of the body that is separate from the central underbody portion and/or with the floor.

According to further additional characteristics of the invention, the floor consists of a single piece which is integral over the entire length of the central underbody portion in the longitudinal direction and over the entire width of the central underbody portion in the lateral direction.

According to further additional characteristics of the invention, the floor, said at least one end piece and the central profile are shaped and assembled together such that over all or part of the length in the longitudinal direction, the longitudinal structural tunnel delimits a hollow reinforcing body of tubular form with a cross-section with closed contour.

According to further additional characteristics of the invention, the central profile and each end piece are attached to an upper face of the floor such that the hollow reinforcing body is situated above the floor, on the passenger compartment side relative to the floor.

According to further additional characteristics of the invention, the cross-section of the central profile in a section plane perpendicular to the extrusion direction has a profile with open contour, in particular in the form of a base situated above and spaced from the floor and extended at its ends by two wings connecting the base and the floor.

According to further additional characteristics of the invention, the central profile (13) is formed of a material with a limit of elasticity greater than 900 MPa.

BRIEF DESCRIPTION OF THE DRAWINGS

Further advantages and characteristics will arise more clearly from the description below of particular embodiments of the invention, given as non-limitative examples and shown on the attached drawings, in which.

Figure 1:
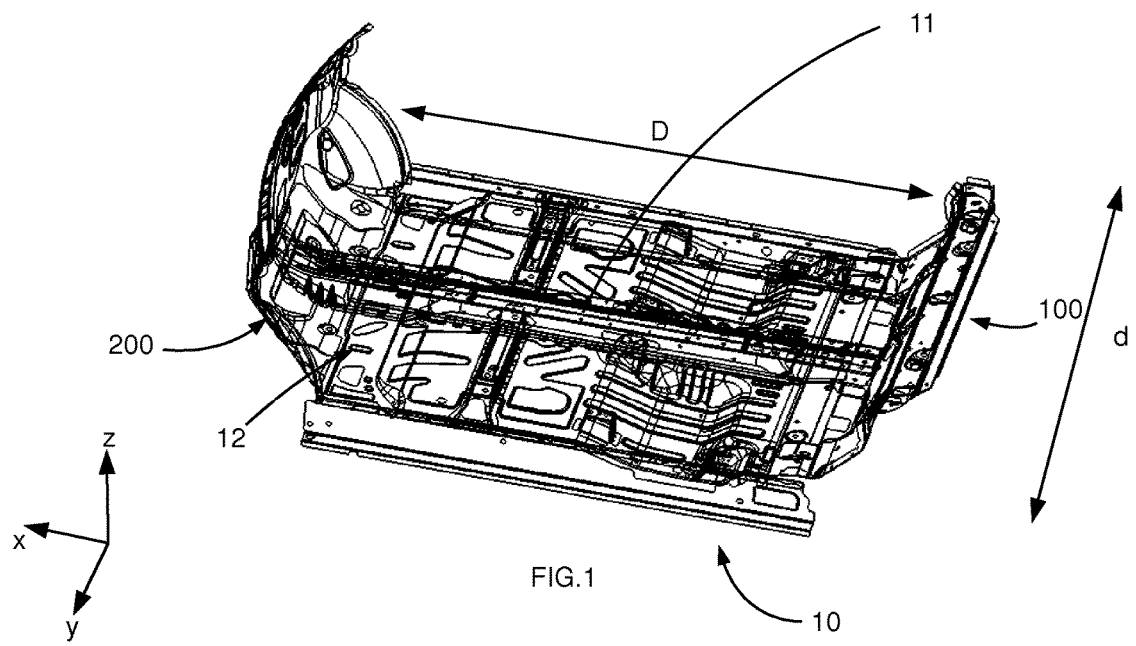
FIGS. 1 and 2 are perspective views of an exemplary central underbody portion according to the invention, respectively in the assembled state and in an exploded view in relation to the longitudinal structural tunnel.
Figure 2:
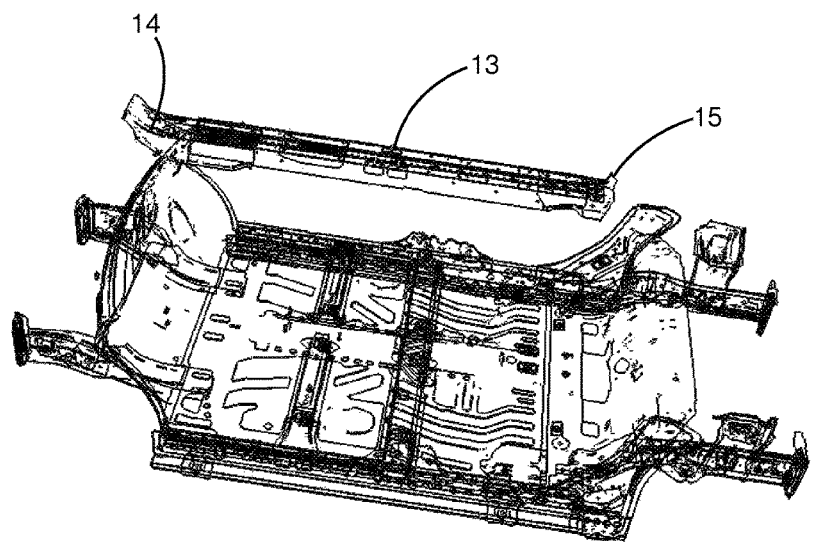
Figure 3:
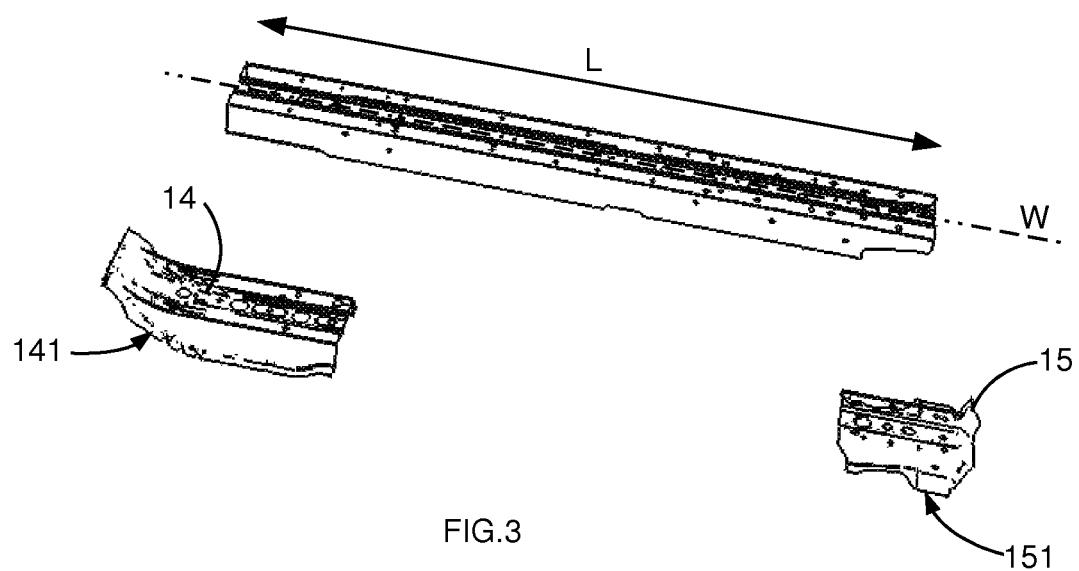
FIGS. 3 and 4 are perspective views of the longitudinal structural tunnel used in the preceding figures, respectively in an exploded state and in the assembled state.
Figure 4:
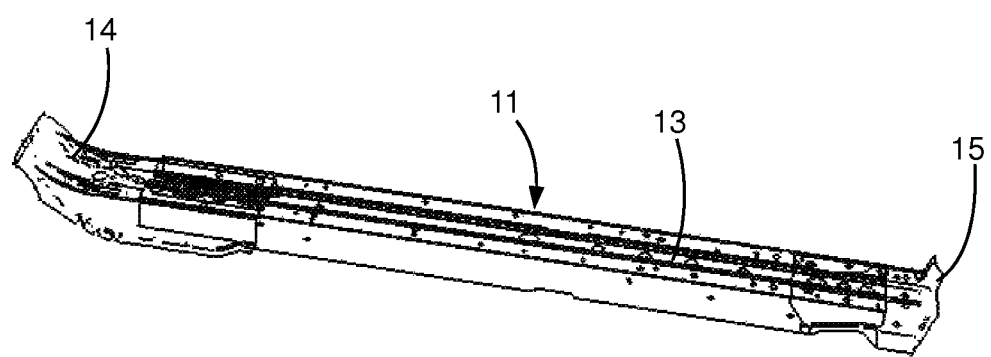

DESCRIPTION OF PREFERRED
EMBODIMENTS OF THE INVENTION

The description below is given with reference to the coordinate system (X, Y, Z) conventionally associated with a motor vehicle, in which X is the horizontal front-rear longitudinal direction of the vehicle, Y is the transverse right-left direction which is horizontal and perpendicular to X, and Z is the vertical direction perpendicular to both directions X and Y. These directions may be considered linked to the structural body of the vehicle and to the vehicle itself.

With reference to FIGS. 1 to 4 in particular, the central underbody portion 10 of the structural body of the motor vehicle, intended to delimit the bottom of the passenger compartment of the vehicle, comprises a longitudinal structural tunnel 11 comprising the assembly of:
- a floor 12 of the central underbody portion 10,
- an integral central profile 13 attached to the floor 12, arranged in a longitudinal direction X of the vehicle and having a length L (FIG. 3) that is directly dependent on the length D of the central underbody portion 10 in the longitudinal direction X,
- and at least one end piece 14, 15 forming an extension of the central profile 13 and configured so as to have an interface 141, 151 providing a connection and a function of absorbing and transmitting forces with a structural portion 100, 200 of the body that is separate from the central underbody portion 10 and/or with the floor 12.

Figure 5:
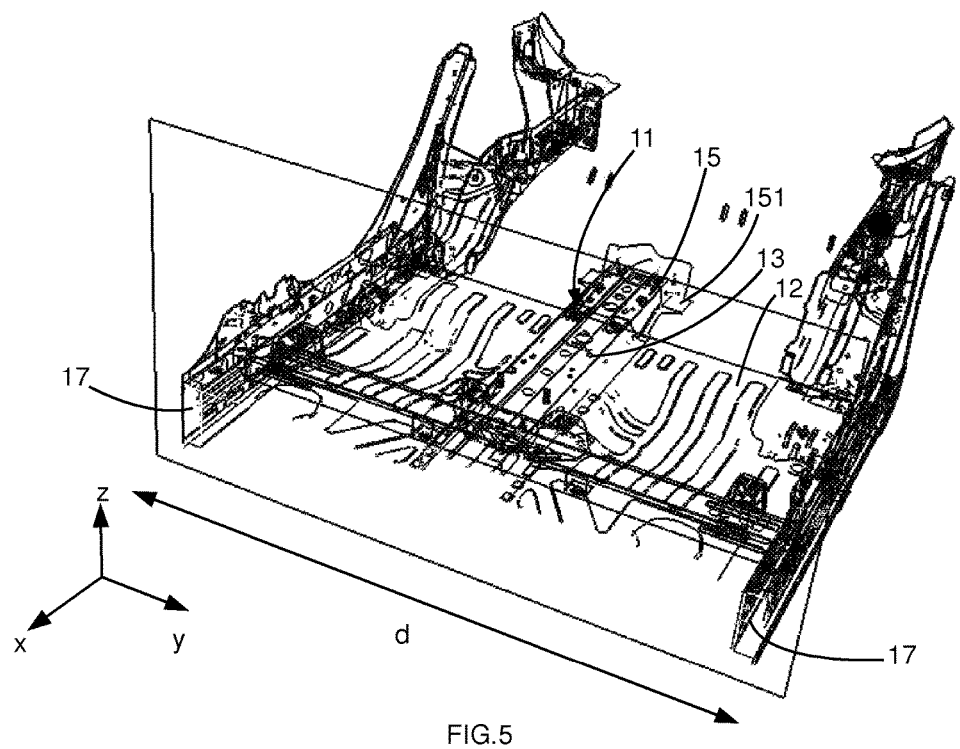
FIGS. 5 and 6 show, in a section produced along a lateral-vertical section plane, the central underbody portion respectively in a front perspective view and in a view from the front.

The front 200 and rear 100 structural portions are only partially shown. For example, the front portion 200 may comprise at least one front cross-member intended for the transmission or absorption of longitudinal forces relative to the tunnel 11 of the central portion 10, and in some cases relative to valances 17 (FIG. 5).

The supply of this central profile 13 independently of the pieces 14, 15 in interface with the front 200 and rear 100 structural portions, facilitates adaptation of the length L of the central profile 13 as a function of the desired vehicle, in particular as a function of its final length. Thus the central profile 13 may have a length L with a first value dimensioned such that the central underbody portion 10 then has a length D enabling it to receive, on the passenger compartment side, two seats spaced apart in the lateral direction Y. The central underbody portion 10 fitted with the central profile 13 with length L corresponding to this first value constitutes a first type of central underbody portion 10.

In combination, by adaptation of the length L as a direct function of the length D of the central portion 10, the central profile 13 may have a length L with a second value dimensioned such that the central underbody portion 10 has a length D enabling it to receive, on the passenger compartment side, four seats distributed in two rows spaced apart in the longitudinal direction X and each containing two seats spaced apart in the lateral direction Y. The second value is greater than the first value. The central underbody portion 10 fitted with the central profile 13 with the length L corresponding to this second value constitutes a second type of central underbody portion different from the first type of central underbody portion, in particular at the level of their respective lengths D.

In one embodiment, said at least one end piece 14, 15 is configured so that it can be used independently within a central underbody portion 10 of the first type and within a central underbody portion 10 of the second type. The end pieces 14, 15 used in the central underbody portion 10 of the first type are therefore identical to the end pieces 14, 15 used in the central underbody portion 10 of the second type. This allows a substantial reduction in the costs of production, storage and design, and improves the ease of implementation and flexibility.

According to a manufacturing method which is particularly advantageous in relation to its ease and price, the central profile 13 belonging to the first type of central underbody portion 10, and the central profile 13 belonging to the second type of central underbody portion 10, are adapted in particular by cutting from an identical initial profile (not shown).

More precisely, although not exclusive of the field of application where it is possible that only one end piece is used within the longitudinal structural tunnel 11, said at least one end piece 14, 15 comprises:
- a front end piece 14 mounted at the front end of the central profile 13, in the extension of the central profile 13 in the longitudinal direction X, and having an interface 141 providing a connection and a function of absorbing and transmitting forces with a front structural portion 200 of the structural body that is separate from the central underbody portion 10 and/or with the floor 12 of the underbody portion 10, and a rear end piece 15 mounted at the rear end of the central profile 13, in the extension of the central profile 13 in the longitudinal direction X, and having an interface 151 providing a connection and a function of absorbing and transmitting forces with a rear structural portion 100 of the structural body that is separate from the central underbody portion 10 and/or with the floor 12 of the central underbody portion 10.

The central profile 13, the front end piece 14 and the rear end piece 15 are independent of each other and independent of the floor 12. All these pieces 13, 14, are assembled to each other and/or to the floor 12 by any known means suitable for the function of the longitudinal structural tunnel 11.

The length L of the central profile 13 corresponds substantially to the difference between the length D of the central underbody portion 10 less the length of the end pieces 14, 15 in the longitudinal direction, increased by the length of overlap of each end piece 14, 15 relative to the central profile 13 in the overlap zones.

According to one embodiment to facilitate implementation, the floor 12 consists of a single piece which is integral over the entire length D of the central underbody portion 10 in the longitudinal direction X and over the entire width d of the central underbody portion 10 in the lateral direction Y. However, the floor 12 may have any other arrangement, for example resulting from the assembly of a plurality of parts.

Figure 6:
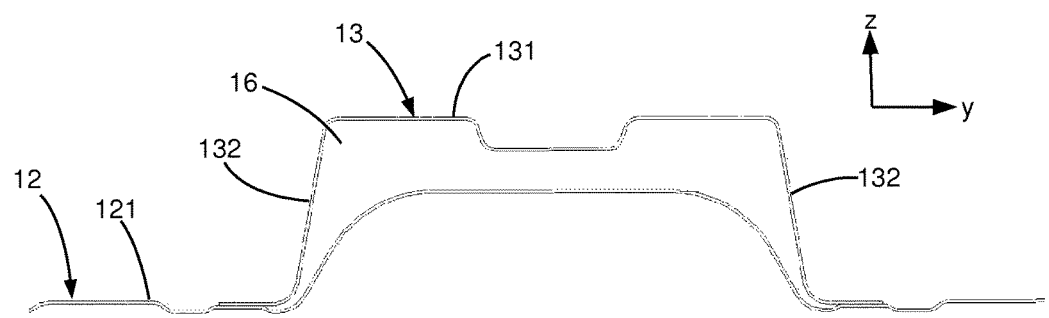

According to a particularly advantageous arrangement in terms of the strength provided relative to the weight and bulkiness of the tunnel 11, the floor 12, said at least one end piece 14, 15 and the central profile 13 are shaped and assembled together such that over all or part of the length in the longitudinal direction X, the longitudinal structural tunnel 11 delimits a hollow reinforcing body of tubular form with a cross-section with closed contour (FIG. 6). Thus the tunnel 11, in the form of a hollow body, delimits on the inside a tubular cavity 16 which extends from the front portion 200 to the rear portion 100. Preferably and with reference to FIG. 6, the central profile 13 and each end piece 14, 15 are attached to an upper face 121 of the floor 12, such that the hollow reinforcing body is situated above the floor 12 in direction Z, i.e. on the passenger compartment side relative to the floor 12. This promotes the corrosion-resistance of the tunnel 11 at very low cost.

The term "hollow body" preferably means the fact that the body delimits a cavity or volume closed or partially open towards the outside. The delimitation of such cavities or volumes contributes greatly to the rigidity under compression, flexion, torsion and shearing of the central underbody portion 10 of the structural body, and complies with the functional specifications conventionally applied to a body portion.

The hollow reinforcing body is configured (dimensioning, orientation, form of cross section, spatial arrangement etc.) so as to absorb a majority of forces (compression, torsion, shearing) exerted on the central underbody portion 10 in the case of impact (front, rear, lateral etc.) applied to the front portion 200 and/or the rear portion 100 of the vehicle equipped with this central portion 10.

It should also be specified that the term "reinforcing" preferably means that the hollow body thus defined bears the great majority or the entirety of the input and output mechanical forces exerted on the central portion concerned, in some cases in cooperation with valances 17 (FIG. 5) arranged along each longitudinal edge of the central portion 10, wherein each may have the form of a hollow reinforcing body in the same way as the tunnel 11.

According to an embodiment with reference to FIG. 6, the section of the central profile 13 in a section plane perpendicular to the direction of extrusion W (FIG. 3), i.e. in a section plane (Y, Z) when the central profile 13 is mounted on the floor 12, has a profile with contour open towards the bottom, in particular in the form of a base 131 situated above in direction Z and spaced from the floor 12, and extended at its ends by two wings 132 connecting the base 131 and the floor 12. The cross-section of the central profile 13 may advantageously be constant over its entire length, facilitating its manufacture for example by an extrusion operation. Such a cross-section of the central profile 13 has the shape of an inverted U.

Advantageously, the central profile 13 is formed of a material with a limit of elasticity greater than 900 MPa. This gives a very high strength and great rigidity despite the low weight and dimensions of the tunnel 11. The thickness of the central profile 13 is advantageously between 0.8 and 1 mm, in particular of the order of 0.9 mm. Such a material is for example XE780C or CP1000.

The structural body of the motor vehicle comprises a central underbody portion 10 described above, a rear structural portion 100 integral with the rear edge of the central underbody portion 10, a front structural portion 200 integral with the front edge of the central of the body portion 10. The longitudinal structural tunnel 11 of the central underbody portion 10 ensures full or partial transmission of forces from the front structural portion 200 to the rear structural portion 100 or vice versa, via the central underbody portion 10, in particular in the case of front external impact applied to the front structural portion 200 and/or rear external impact applied to the rear structural portion 100 of the vehicle. The remaining part of the forces may be transmitted via the valances 17 in particular.

At least via the front end piece 14 of the longitudinal structural tunnel 11, the central underbody portion 10 comprises front structural elements ensuring the absorption of forces and/or transmission of forces, in particular in the case of front or longitudinal impact on the vehicle at the front structural portion 200, between the front structural portion 200 of the body and the central underbody portion 10 of the body. At least via the rear end piece 15 of the longitudinal structural tunnel 11, the central underbody portion 10 also comprises rear structural elements ensuring the absorption of forces and/or the transmission of forces, in particular in the case of rear or longitudinal impact on the vehicle at the rear structural portion 100, between the rear structural portion 100 of the body and the central underbody portion 10 of the body.

An advantageous method for manufacturing such a central underbody portion 10 may comprise a step of adapting the length L of the central profile 13 as a function of the length D of the central underbody portion 10 in the longitudinal direction X of the vehicle. The step of adaptation may in particular comprise a step of providing an initial profile mentioned above, then a step of cutting this initial profile to define the length L of the central profile 13, in particular by selecting from at least one length L equal to the first value corresponding to the first type of central underbody portion 10, and a length L equal to the second value corresponding to the second type of central underbody portion 10.

The solution described here provides a structuring of a central floor of a motor vehicle with a tunnel 11 of quality material, profiled and connected to a floor 12, forming a hollow body of a structure adaptable in length and guaranteeing a high level of forces in the structure and in the case of impact.

After being connected to the floor 12, the assembly allows progressive crushing of the front portion of the tunnel 11 and of the rear portion, while preserving the central profile 13 as far as possible, and hence the passenger compartment and its occupants.

The invention claimed is:

1. A method for manufacturing a central underbody portion of a structural body of a motor vehicle, to delimit a bottom of a passenger compartment of the vehicle, including a longitudinal structural tunnel, comprising:
   providing a floor of the central underbody portion, the floor including a raised central portion and lower portions extending from the central portion to peripheral edges of the floor in a transverse direction of the vehicle;
   attaching a front end piece directly to a front end of an integral central profile as an extension of the integral central profile in a longitudinal direction of the vehicle and attaching a rear end piece directly to a rear end of the integral central profile as an extension of the integral central profile in the longitudinal direction, the integral central profile including a base and wings; and
   after the attaching the front end piece directly to the front end of the integral central profile and the attaching the rear end piece directly to the rear end of the integral central profile, attaching the integral central profile to an upper face of the floor at a center of the floor in a lateral direction of the vehicle, arranged in the longitudinal direction of the vehicle and having a length that is dependent on a length of the central underbody portion in the longitudinal direction,
   wherein the front end piece and the rear end piece form an extension of the central profile so as to have an interface providing a connection and a function of absorbing and transmitting forces with at least one of a structural portion of the body that is separate from the central underbody portion and the floor,
   wherein the attaching includes adapting the length of the central profile as a function of the length of the central underbody portion in the longitudinal direction of the vehicle,
   wherein the the attaching the integral central profile to the upper face of the floor is performed such that the raised central portion is positioned above the lower portions in a vertical direction of the vehicle,
   wherein the attaching the integral central profile to the upper face of the floor is performed such that the wings are connected to the upper face of the floor at the lower portions of the floor, and the base extends between the wings above the raised central portion of the floor, and
   wherein, after the attaching the integral central profile to the upper face of the floor, the floor, the central profile, the front end piece, and the rear end piece form the longitudinal structural tunnel that delimits a hollow body.

2. The manufacturing method as claimed in claim 1, wherein the adapting includes providing an initial profile then cutting the initial profile to define the length of the central profile by selecting from at least a length according to a first value corresponding to a first type of central underbody portion and a length according to a second value corresponding to a second type of the central underbody portion.

3. The manufacturing method as claimed in claim 1, wherein, when the length of the central underbody portion enables the central underbody portion to receive, on a side of central underbody portion facing the passenger compartment, two seats spaced apart in the lateral direction of the vehicle, the length of the central profile is equal to a first value.

4. The manufacturing method as claimed in claim 3, wherein, the central profile when the length of the central underbody portion enables the central underbody portion to receive, on the side of central underbody portion facing the passenger compartment, four seats distributed in two rows spaced apart in the longitudinal direction and each containing two seats spaced apart in the lateral direction, the length of the central profile is equal to a second value that is greater than the first value.

5. The manufacturing method as claimed in claim 4, wherein said front end piece and the rear end piece are each configured to be used when the length of the central profile has the first value and when the length of the central profile has the second value.

6. The manufacturing method as claimed in claim 5, wherein the central profile with the length having the first value and the central profile with the length having the second value are each configured to be adapted from an identical initial profile.

7. The manufacturing method as claimed in claim 6, wherein:
   said front end piece includes an interface providing a connection and a function of absorbing and transmitting forces with at least one of a front structural portion of the body that is separate from the central underbody portion and the floor, and
   said rear end piece includes an interface providing a connection and a function of absorbing and transmitting forces with at least one of a rear structural portion of the body that is separate from the central underbody portion and the floor.

8. The manufacturing method as claimed in claim 7, wherein the floor comprises a single piece which is integral over the entire length of the central underbody portion in the longitudinal direction and over the entire width of the central underbody portion in the lateral direction.

9. The manufacturing method as claimed in claim 8, wherein the hollow reinforcing body is of tubular form with a cross-section with closed contour.

10. The manufacturing method as claimed in claim 9, wherein the central profile, the front end piece, and the rear end piece are attached to the upper face of the floor such that the hollow reinforcing body is situated above the floor, on the side of central underbody portion facing the passenger compartment relative to the floor.

11. The manufacturing method as claimed in claim 10, wherein a cross-section of the central profile in a section plane perpendicular to the longitudinal direction has a profile with open contour.

12. The manufacturing method as claimed in claim 11, wherein the central profile is formed of a material with a limit of elasticity greater than 900 MPa.

13. The manufacturing method as claimed in claim 9, wherein the hollow body extends from a front of the central underbody portion to a rear of the central underbody portion in the longitudinal direction.

14. The manufacturing method as claimed in claim 5, wherein the central profile with the length having the first value and the central profile with the length having the second value are each configured to be adapted by cutting from an identical initial profile.

15. The manufacturing method as claimed in claim 1, wherein a shape of the central profile in a cross-section of the central profile in a section plane perpendicular to the longitudinal direction is constant over an entirety of the length of the central profile.

\* \* \* \* \*